(12) United States Patent
Yamamoto et al.

(10) Patent No.: US 7,891,929 B2
(45) Date of Patent: Feb. 22, 2011

(54) CARRIAGE SYSTEM

(75) Inventors: Makoto Yamamoto, Yasu (JP); Kenji Hoshino, Nagoya (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 275 days.

(21) Appl. No.: 11/319,733

(22) Filed: Dec. 29, 2005

(65) Prior Publication Data

US 2006/0182553 A1 Aug. 17, 2006

(30) Foreign Application Priority Data

Jan. 20, 2005 (JP) ............................. 2005-012247
Mar. 31, 2005 (JP) ............................. 2005-100371

(51) Int. Cl.
*B65G 65/00* (2006.01)

(52) U.S. Cl. ....................................... 414/281; 414/940

(58) Field of Classification Search ................. 414/281, 414/282, 217, 940; 104/88.01
See application file for complete search history.

(56) References Cited

U.S. PATENT DOCUMENTS

| 5,584,118 | A | 12/1996 | Furukawa et al. |
| 6,183,184 | B1 * | 2/2001 | Shiwaku ...................... 414/281 |
| 6,726,429 | B2 * | 4/2004 | Sackett et al. ................ 414/217 |
| 6,799,521 | B2 * | 10/2004 | Tai et al. .................. 104/88.01 |
| 7,101,138 | B2 * | 9/2006 | Fosnight et al. ......... 414/222.11 |
| 7,108,121 | B2 * | 9/2006 | Fujimura et al. .......... 198/347.1 |
| 7,165,927 | B2 * | 1/2007 | Doherty et al. ........ 414/331.02 |
| 2003/0156928 | A1 | 8/2003 | Sackett et al. |
| 2003/0168313 | A1 | 9/2003 | Hiroki |
| 2004/0109746 | A1 * | 6/2004 | Suzuki ........................ 414/373 |
| 2005/0135906 | A1 * | 6/2005 | Fosnight et al. .............. 414/277 |
| 2006/0051188 | A1 * | 3/2006 | Hoshino ...................... 414/277 |
| 2006/0222479 | A1 * | 10/2006 | Shiwaku et al. .............. 414/267 |

FOREIGN PATENT DOCUMENTS

JP    10-109887      4/1998
JP    2002-353290 A  12/2002

OTHER PUBLICATIONS

European Search Report dated Apr. 10, 2006.
Notification of Reason(s) for Refusal dated Jan. 15, 2009, Application No. 2005-100371.

* cited by examiner

*Primary Examiner*—Saúl J Rodríguez
*Assistant Examiner*—Joshua I Rudawitz
(74) *Attorney, Agent, or Firm*—Westerman, Hattori, Daniels & Adrian, LLP

(57) ABSTRACT

A running rail 9 and a second overhead vehicle 12 are arranged parallel to a running rail 7 for a first overhead vehicle 10 and closer to inspection devices 20 than the running rail 7. A buffer 14 is provided below the running rail 7. The overhead vehicle 12 conveys a cassette 40 between load ports 24 and the buffer 14. The overhead vehicle 10 conveys the cassette 40 between the buffer 14 and other positions. The present invention can deal with inspection devices or the like which have a high throughput by locally improving their conveying capability.

3 Claims, 6 Drawing Sheets

CARRIAGE SYSTEM

FIELD OF THE INVENTION

The present invention relates to a system using a carriage such as an overhead vehicle or a rail-guided carriage, and in particular, to improvement of throughput.

BACKGROUND OF THE INVENTION

In connection with conveyance of articles in semiconductor plants or the like, facilities such as inspection devices must process a large number wafers or the like per a unit time (these facilities have a high throughput). Accordingly, compared to the other facilities, these facilities must enhance their conveying capabilities locally, for example, around inspection devices. To locally enhance the conveying capability, it is preferable to provide random-access buffers. In an easily conceivable example, a circulating conveyor is connected to load ports of the inspection devices so that articles can be freely transferred between a carriage and a plurality of positions on the conveyor. However, to precisely transfer articles to and from the carriage, such a conveyor must be able to convey articles while maintaining a relatively high positional precision. Further, the conveyor must operate precisely in accordance with a procedure of transfer of articles to and from the carriage and with the conveyance of articles to and from the load ports. The circulating conveyor having such a precision and reliability requires large-scale facilities and a reliable system that controls the conveyor.

The Japanese Patent No. 3067656 describes that a buffer is provided between processing devices below a conveying path for an overhead vehicle. Such a buffer improves conveyance efficiency but is insufficient for facilities with a very high throughput.

It is a basic object of the present invention to easily and locally improve the conveying capability of desired facilities.

It is an additional object of an aspect of the present invention set forth in Claim 2 to efficiently utilize space and to further improve the conveyance capability of a first carriage.

It is an additional object of an aspect of the present invention set forth in Claim 3 to construct the first carriage and a second carriage using carriages of basically the same type, thus simplifying the configuration of the system and facilitating the transfer of articles between a buffer and facilities.

SUMMARY OF THE INVENTION

The present invention provides a carriage system in which a first carriage is run along a first running route and in which a plurality of facilities are arranged along the first running route so that the first carriage conveys articles between the plurality of facilities, the carriage system being characterized in that a second running route, a second carriage, and a buffer are locally provided near the facilities so that the second carriage can transfer articles between the facilities and the buffer. The second running route is placed for example, parallel to the first running route. Preferably, the facilities to and from which the second carriage delivers and receives articles are for example, predetermined facilities, particularly facilities to and from which articles are frequently conveyed (a facility with a high throughput). Examples of the facilities include processing devices and inspection devices.

Preferably, the first carriage is an overhead vehicle and the first running route is a running rail for the first carriage. Further, the buffer is preferably provided below the running rail and on a side of the second running route.

Particularly preferably, the second carriage is an overhead vehicle and the second running route is a running rail for the second carriage. The second carriage is preferably provided with a platform and a laterally feeding mechanism for the platform so as to transfer articles between the facilities and the buffer. Load ports of the facilities may be located immediately below the second running route or opposite the first running route with respect to the second running route.

According to the present invention, for facilities such as inspection devices which have a high throughput, the second carriage transfers articles between the facilities and the buffers. The first carriage transfers articles between the buffers and other facilities. By locally placing the carriage for the facilities with a high throughput, it is possible to locally improve the conveying capability.

Compared to the case in which a circulating conveyor is connected to the load port of the facility, the present invention eliminates the need to move all the articles on the conveyor. It is only necessary that the second carriage move only the required articles between the facility and the buffer. This simplifies the facilities and makes it possible to keep articles precisely positioned. The above description is not intended to exclude the provision of the conveyor for the buffer.

According to the aspect of the present invention set forth in Claim 2, the buffer is provided below the running rail for the first carriage. This saves space and requires the first carriage only to deliver and receive articles to and from the buffer located below the running route. Further, it is unnecessary to feed articles laterally from the running route. Thus, the first carriage can be efficiently operated. In particular, when the buffer comprises a plurality of randomly accessible storage sites and the first carriage can deliver and receive articles directly to and from the position of each storage site, the mere control of a stopped position enables the first carriage to deliver and receive required articles.

According to a third aspect of the present invention set forth in Claim 3, both the first and second carriages are overhead vehicles. This facilitates installation and maintenance of the carriage system. Then, the platform of the second carriage is used to deliver or receive articles to or from the load port of the facility. Articles can be transferred between the load port and the buffer by laterally feeding the platform.

DETAILED DESCRIPTION OF THE PREFERRED EMBODIMENTS

Figure 1:
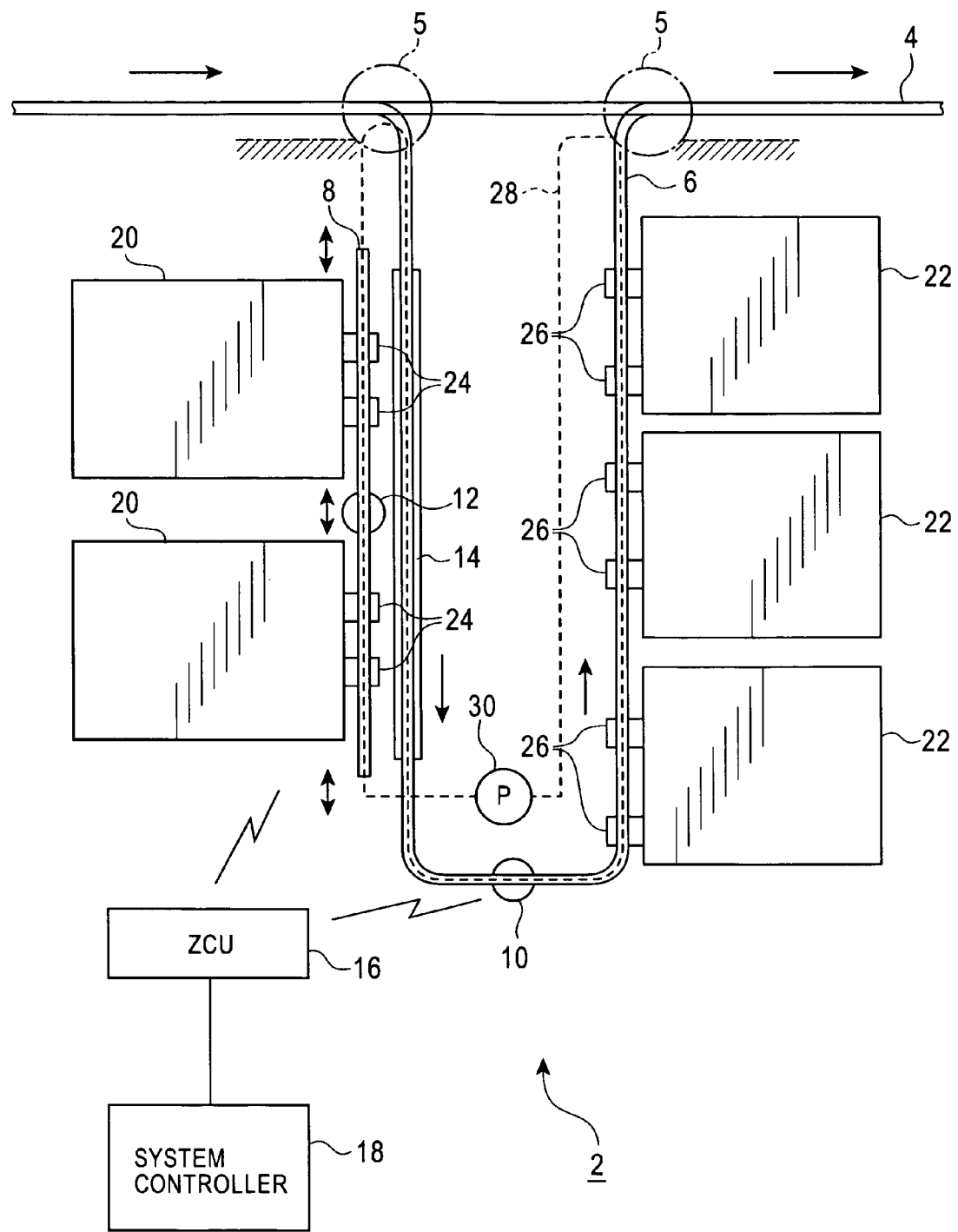
FIG. 1 is a plan view showing the layout of an essential part of an overhead vehicle system in accordance with an embodiment.

A description will be given below of an optimum embodiment for carrying out the present invention.

FIGS. 1 to 6 show embodiments and a variation. In these figures, 2 is an overhead vehicle system comprising an inter-bay route 4 constituting an infrastructure and an intra-bay route 6 for each bay. 5 is a branching and joining portion located between the inter-bay route 4 and the intra-bay route 6. The inter-bay route 4 or the intra-bay route 6 is an example of a first running route. A local route 8 is provided near facilities requiring a high conveying capability so as to lie parallel to the intra-bay route 6. The local route 8 is an example of a second running route. 10 is an overhead vehicle running on the inter-bay route 4 or the intra-bay route 6. The overhead vehicle 10 is an example of a first carriage. 12 is an overhead vehicle that for example, reciprocates on the local route 8. The overhead vehicle 12 is an example of a second carriage. 14 is a buffer provided parallel to the local route 8 and below the intra-bay route 6. The overhead vehicle 10 can deliver and receive articles to and from any position (address).

16 is a zone controller that manages the intra-bay route 6 and the local bay route 8 as well as an area closer to the bay than the branching and joining portion 5 (the area below the chain line in FIG. 1). In the intra-bay route 6, the overhead vehicle 10 is controlled by a zone controller 16. If the overhead vehicle 10 is in the part of the inter-bay route 4 located outside the branching and joining portion 5, it is controlled by another zone controller. The overhead vehicle 12 running on the local route 8 is always controlled by the zone controller 16. Here, for interlocking with the buffer 14, the local route 8 and a section of the intra-bay route 6 which is parallel to the local route 8 are preferably controlled by the common zone controller 16. 18 is a system controller which controls the whole overhead vehicle system 2 and which communicates with other zone controllers (not shown in the drawings) and a production controller that manages all the processing facilities including semiconductor processing devices or liquid crystal processing devices.

20 is an inspection device that is an example of a facility requiring only a short processing time per article and having a high throughput. 22 is another processing device having a lower throughput than the inspection device 20. Articles are frequently conveyed to and from load ports 24 of the inspection devices 20. Articles are infrequently conveyed to and from load ports 26 of the inspection devices 22. The overhead vehicles 10, 12 are supplied with power through an electricity feeding line 28, in this case, in a non-contact manner. The electricity feeding line 28 is used for the communication between the overhead vehicles 10, 12, and for the communication between the overhead vehicles 10, 12 and the zone controller 16. The possibility of the direct communication between the two types of overhead vehicles 10, 12 is convenient for interlocking with the buffer 14. Thus, as shown in FIG. 1, connections are preferably made to a power source 30 so that the electricity feeding line 28 forms a loop passing through both the intra-bay route 6 and the local route 8.

Here, the overhead vehicle 10 runs on both the inter-bay route 4 and the intra-bay route 6. However, the overhead vehicle 10 may run on the intra-bay route 6. In this case, another overhead vehicle is run on the inter-bay route 4. Also in this case, the local route 8 and the overhead vehicle 12 are required specifically to enhance the conveying capability of the inspection devices 20. In the embodiment, the overhead vehicle 12 is used as a second carriage. However, for example, ground rail-guided carriage may be used in place of the overhead vehicle 12. However, it is more advantageous to provide the two types of overhead vehicles 10, 12 and the two types of running routes 6, 8 in parallel in connection with the configuration and maintenance of the system, the utilization of a floor space, and the like.

Figure 2:
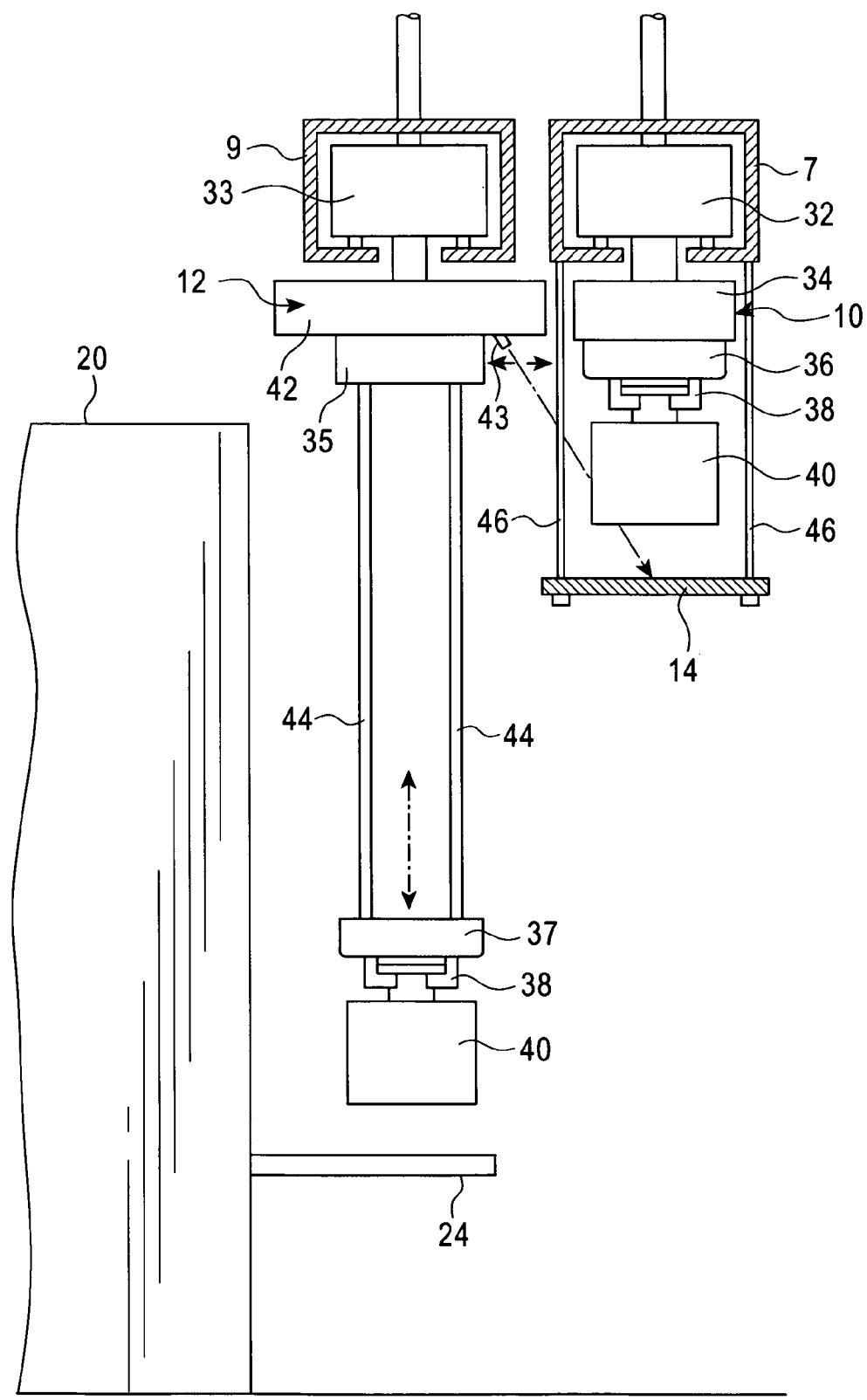
FIG. 2 is a front view of an essential part of the overhead vehicle system in accordance with the embodiment, showing two types of overhead vehicles, a buffer, and load ports.

FIG. 2 shows the configuration of the overhead vehicles 10, 12. 7 is a running rail corresponding to the intra-bay route. 9 is a running rail corresponding to the local route. The running rails 7, 9 are arranged parallel to each other and both supported by for example, being hung from the ceiling of the clean room. The overhead vehicle 10 is provided with a running driving section 32, an elevation and lowering driving section 34, and a platform 36. The overhead vehicle 10 uses a chuck 38 to hold an article such as a semiconductor cassette 40 to deliver or receive it to or from the buffer 14. The overhead vehicle 10 may also be provided with a laterally feeding section 42 that feeds the elevation and lowering driving section 34 laterally with respect to the running rail 7. However, the laterally feeding section need not necessarily provided.

In the overhead vehicle 12 side, a running driving section 33 runs along the running rail 9, and an elevation and lowering driving section 35 elevates and lowers a platform 37. A laterally feeding section 42 laterally feeds the elevation and lowering driving section 35 and the platform 37 in a direction normal to the running rail 9. The laterally feeding section 42 uses an appropriate laterally feeding mechanism to laterally feed, for example, the elevation and lowering driving section 35 while using its bottom to guide it. 43 is an article detecting sensor provided at an appropriate position on the overhead vehicle 12 to detect the presence or absence of an article on the buffer 14. The article detecting sensor 43 may read the ID of the cassette 40 as in the case of for example, a bar code reader or an RFID reader instead of simply detecting the presence or absence of an article. 44 is a hanging material such as a wire, a rope, or a belt. A similar hanging material is used to elevate and lower the platform 36 of the overhead vehicle 10. 46 is a hanging bolt that is a member hanging the buffer 14 from the running rail 7.

The overhead vehicles 10, 12 may have the same structure. However, the laterally feeding section 42 need not be provided in the overhead vehicle 10 side. The overhead vehicle 12 has only to be able to reciprocate on the local route 8, which is shorter than the other routers. Accordingly, the running driving section 33 of the overhead vehicle 12 may be simpler than that of the overhead vehicle 10, which must run over a long distance. The elevation and lowering driving section 35 and the platform 37 may be the same as or difference from the elevation and lowering driving section 34 and platform 36 in the overhead vehicle 10. The running rails 7, 9 are installed in for example, a space for a passage between the inspection device 20 and the processing device 22. The buffer 14 is provided below the running rail 7, and the overhead vehicle 10 can deliver and receive the cassette 40 without the need to laterally feed it. The buffer 14 is a shelf on which the cassette 40 can be placed and does not comprise a conveyor or the like. When the buffer 14 is provided in the overhead vehicle 10 slightly below the height of bottom of the cassette 40 during conveyance, it is possible to avoid obstructing an operator, an automated guided vehicle, or the like when the operator, automated guided vehicle, or the like is moving through the space below the buffer 14.

Figure 3:
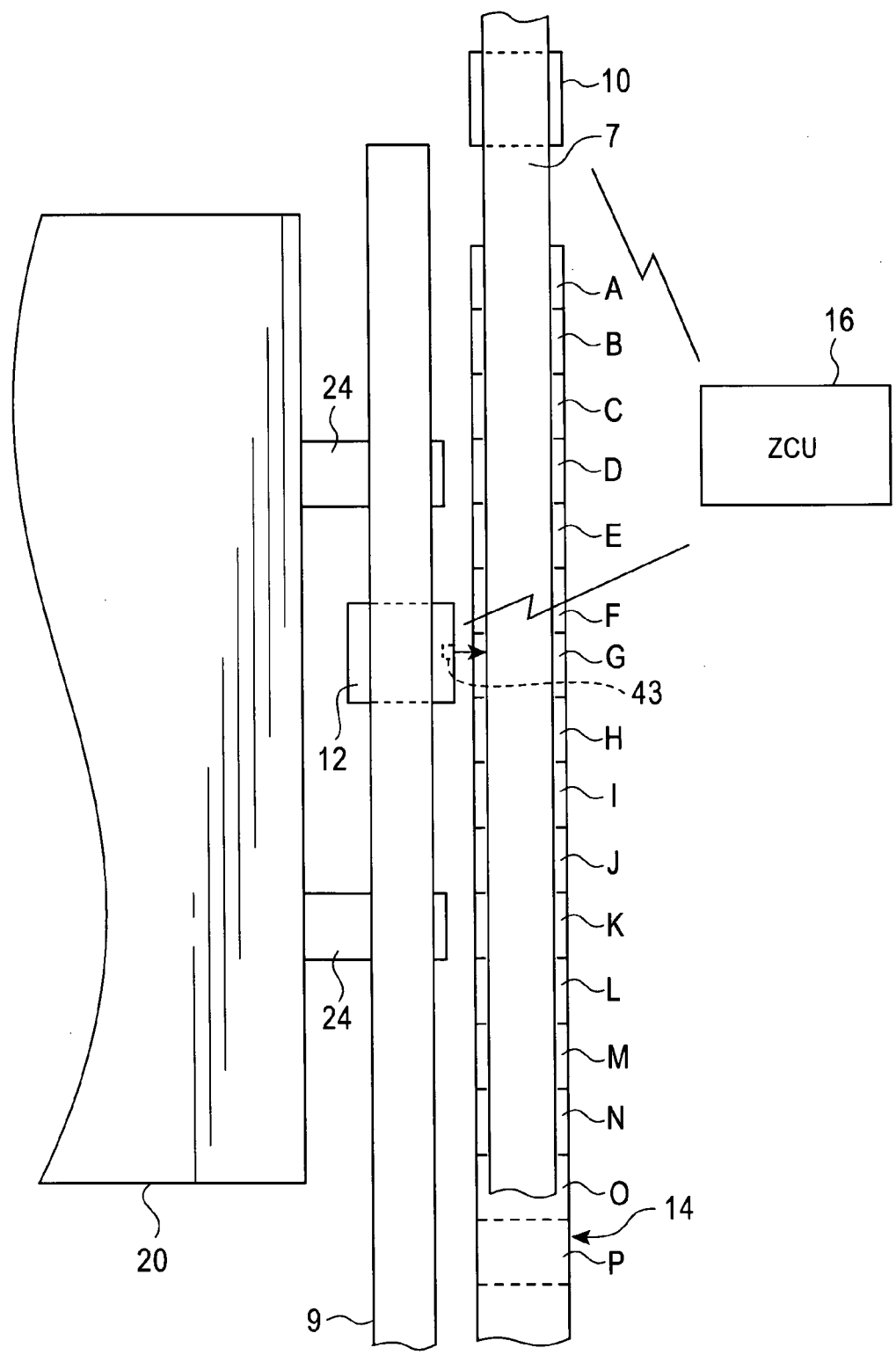
FIG. 3 is a plan view of an essential part of the overhead vehicle system in accordance with the embodiment, showing the relationship between the load ports and the buffer.

FIG. 3 shows the relationship between the running rail 9 for the local route and the running rail 7 for the intra-bay route. The running rails 7, 9 are arranged parallel to each other, and the load port 24 is located below the running rail 9, and the buffer 14 is located below the running rail 7 as described above. The buffer 14 is provided with addresses A to P and the like for the respective storage positions of the cassettes 40. The article detecting sensor 43 detects at which of the addresses an article is present. Of the addresses A to P in FIG. 3, at the addresses D and K, the overhead vehicle 12 can deliver or receive the cassette without the need to run from a stopped position for the load port 24. Thus, the addresses D and K are the most valuable storage sites. For the storage positions except the addresses D and K, the overhead vehicle 12 runs along the running rail 9 to deliver or receive the article.

Figure 4:
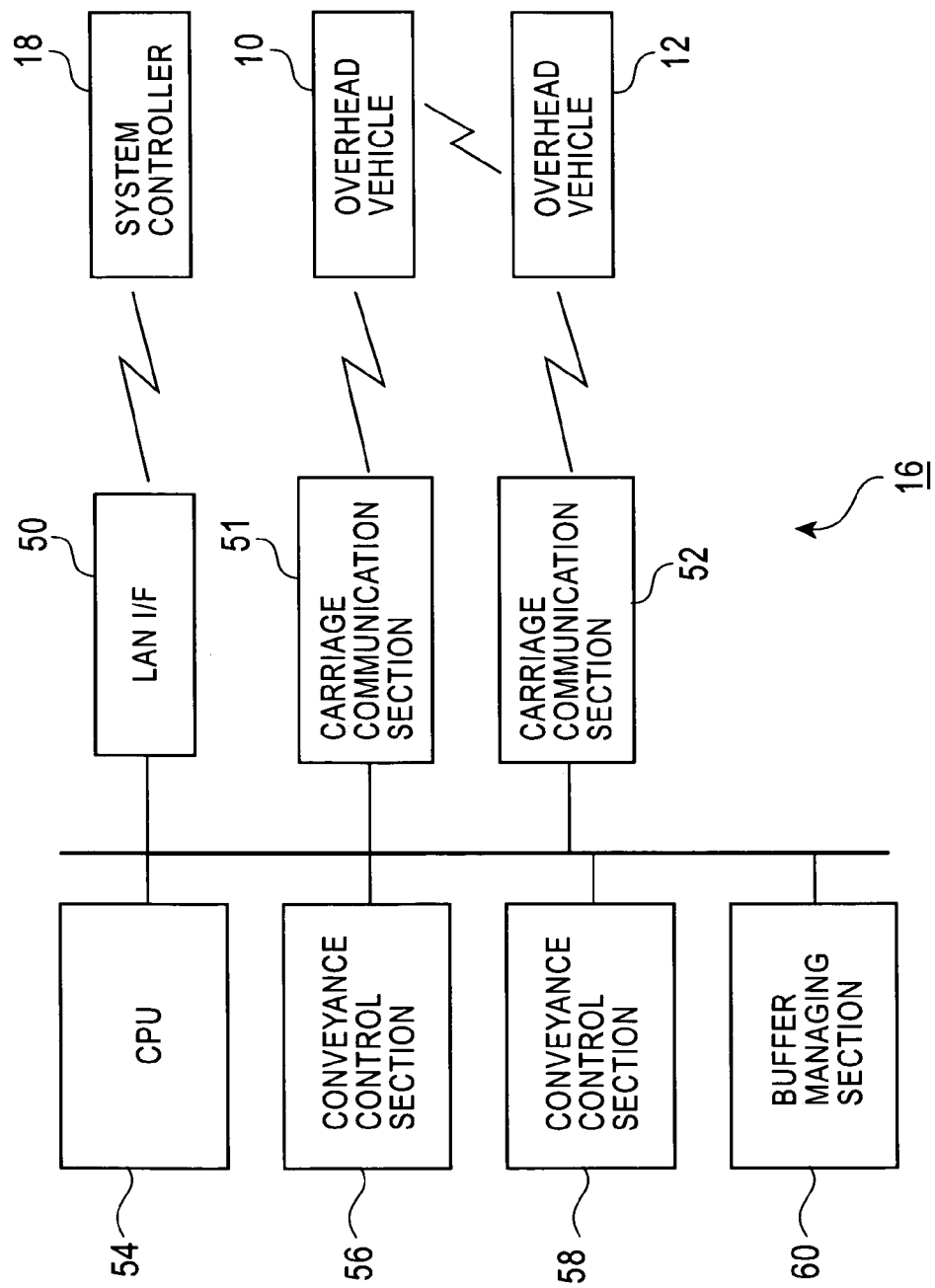
FIG. 4 is a block diagram of a zone controller used in the overhead vehicle system in accordance with the embodiment.

FIG. 4 shows the configuration of the zone controller 16. A LAN interface 50 communicates with the system controller 18. A carriage communication section 51 communicates with the overhead vehicle 10 in the intra-bay route, and a carriage communication section 52 communicates with the overhead vehicle 12 in the local route. These communication sections may be implemented by a common carriage communication section. Further, the overhead vehicles 10, 12 can communicate directly with each other via the electricity feeding line. 54 is a CPU that may be a programmable controller or the like. 56, 58 are conveyance control sections, and the conveyance control section 56 controls conveyance in the bay carried out by the overhead vehicle 10. The conveyance control section 58 controls conveyance along the local route carried out by the overhead vehicle 12. The buffer managing section 60 manages articles on the buffer, and stores, for each address of the buffer, the presence or absence of an article and the ID and destination (the load port of an inspection device or another facility) of an article if any.

To transfer articles between the inspection device 20 and the buffer 14, the conveyance control section 58 specifies the address of a load port and an address on the buffer as the address of the destination. The article detecting sensor 43 prevents an attempt to unload an article to the address at which an article is already present or to load an article from an address at which no article is present. The buffer managing section 60 stores the ID of an article present at each section on the buffer. The validity of data in the buffer managing section 60 can be checked by using the article detecting sensor 43 to detect an article on the buffer 14.

If an article is to be delivered to or received from an address on the buffer facing the load port 24, the platform may be elevated from or lowered to the load port, laterally fed toward the buffer, and slightly elevated or lowered between the load port and the buffer. Transfers do not require the overhead vehicle 12 to run. This is efficient.

The controller outside of the intra-bay route specifies the address of the load port 24 of the inspection device 20 instead an address on the buffer as the destination of the overhead vehicle 10 in order to reduce burdens. When the overhead vehicle 10 advances into the intra-bay route 6, the zone controller is informed of the ID of the article by the overhead vehicle or another controller. On the basis of this, the zone controller specified the address on the buffer 14 for the overhead vehicle 10.

The overhead vehicle 10 has only to deliver or receive articles to or from the buffers located immediately below the running rail 7. The overhead vehicle 10 does not require lateral feeding and has a short stroke for elevation and lowering of the platform. Moreover, the order in which articles are conveyed to or from of the load port 24 of the inspection device 20 is determined by the order in which the overhead vehicle 12 conveys articles to or from the load port 24, and it may be different from the order in which articles are transferred between the overhead vehicle 10 and the buffer 14. Thus, it is unnecessary to be conscious of the order in which articles are delivered to or received from the load port 24, in connection with the management of the overhead vehicle 10.

The overhead vehicles 10, 12 can run without interfering with each other. However, when attempting to deliver or receive an article to or from the same address on the buffer at the same time, the overhead vehicles 10, 12 interfere with each other. Such interference can be prevented by the zone controller 16 or by allowing the overhead vehicles 10, 12 to notify, of each other, the address on the buffer 14 to and from which an article is delivered or received. Further, at the height level shown in FIG. 2, when the overhead vehicle 12 laterally moves the elevation and lowering driving section 35 onto the buffer 14, the overhead vehicle 10 is hindered from running. This problem can be solved by reducing the height level of the running rail 9 below that of the running rail 7 so that the bottom surface of the article conveyed by the overhead vehicle 10 is located above the top surface of the elevation and lowering driving section 35, as shown in FIG. 6.

Figure 5:
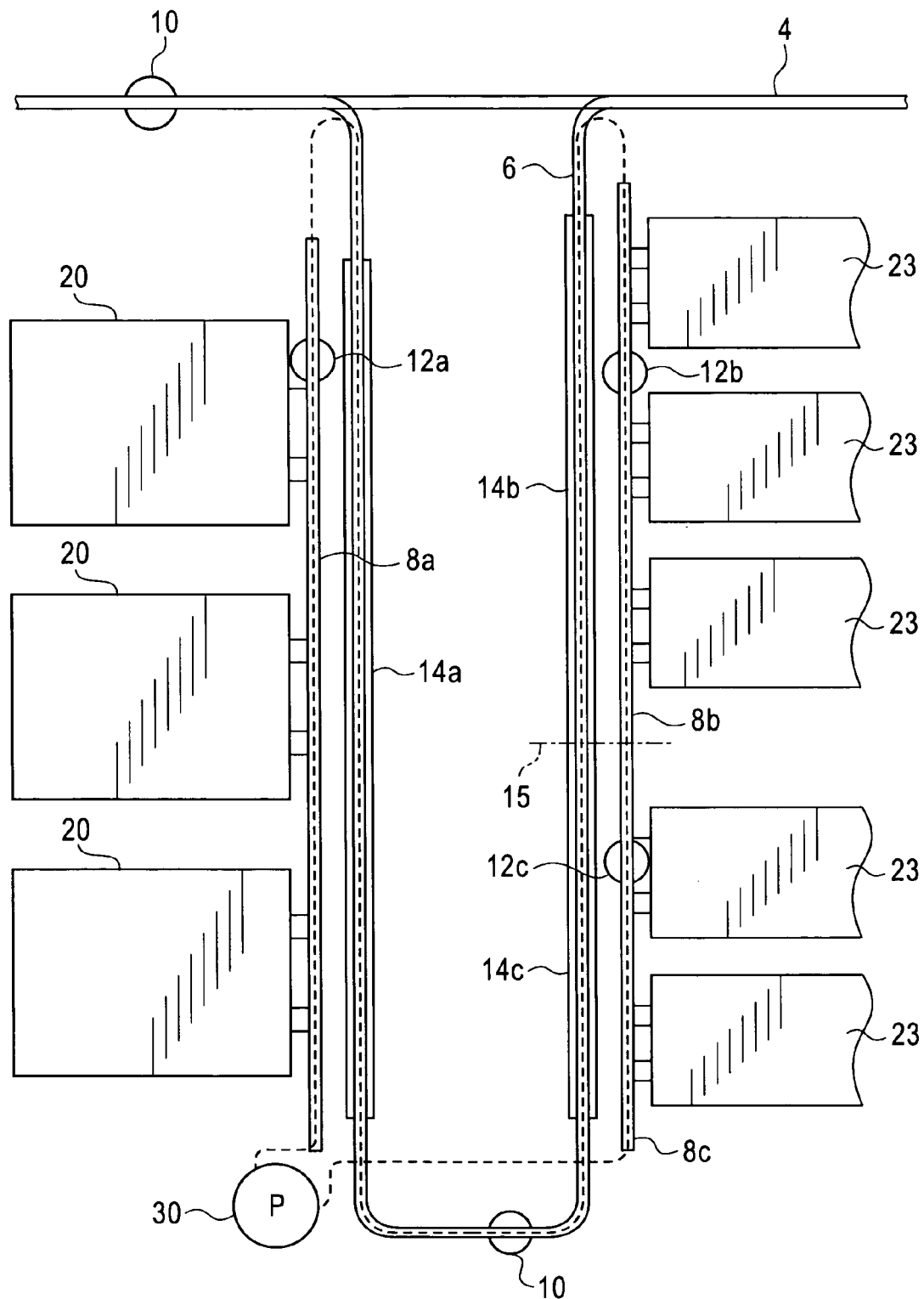
FIG. 5 is a plan view showing the layout of an essential part of an overhead vehicle system in accordance with a variation.

FIG. 5 shows a variation. It is assumed that in addition to the inspection device 20, processing devices 23 requiring a high throughput are arranged along the intra-bay route 6. A local route 8a, an overhead vehicle 12a, and a buffer 14a are provided for the inspection devices 20. Two overhead vehicles 12b, 12c, two local routes 8b, 8c, and two buffers 14b, 14c are provided for the processing devices 23. To prevent the interference between the overhead vehicles 12b, 12c, the local routes 8b, 8c are separated from each other at a boundary 15. In this case, the overhead vehicles 12a to 12c may be controlled by a single zone controller. Alternatively, the intra-bay route 6 may be divided into three parts, the vicinity of the local route 8a, the vicinity of the local route 8b, and the vicinity of the local route 8c and separate zone controllers may be provided for these parts.

Figure 6:
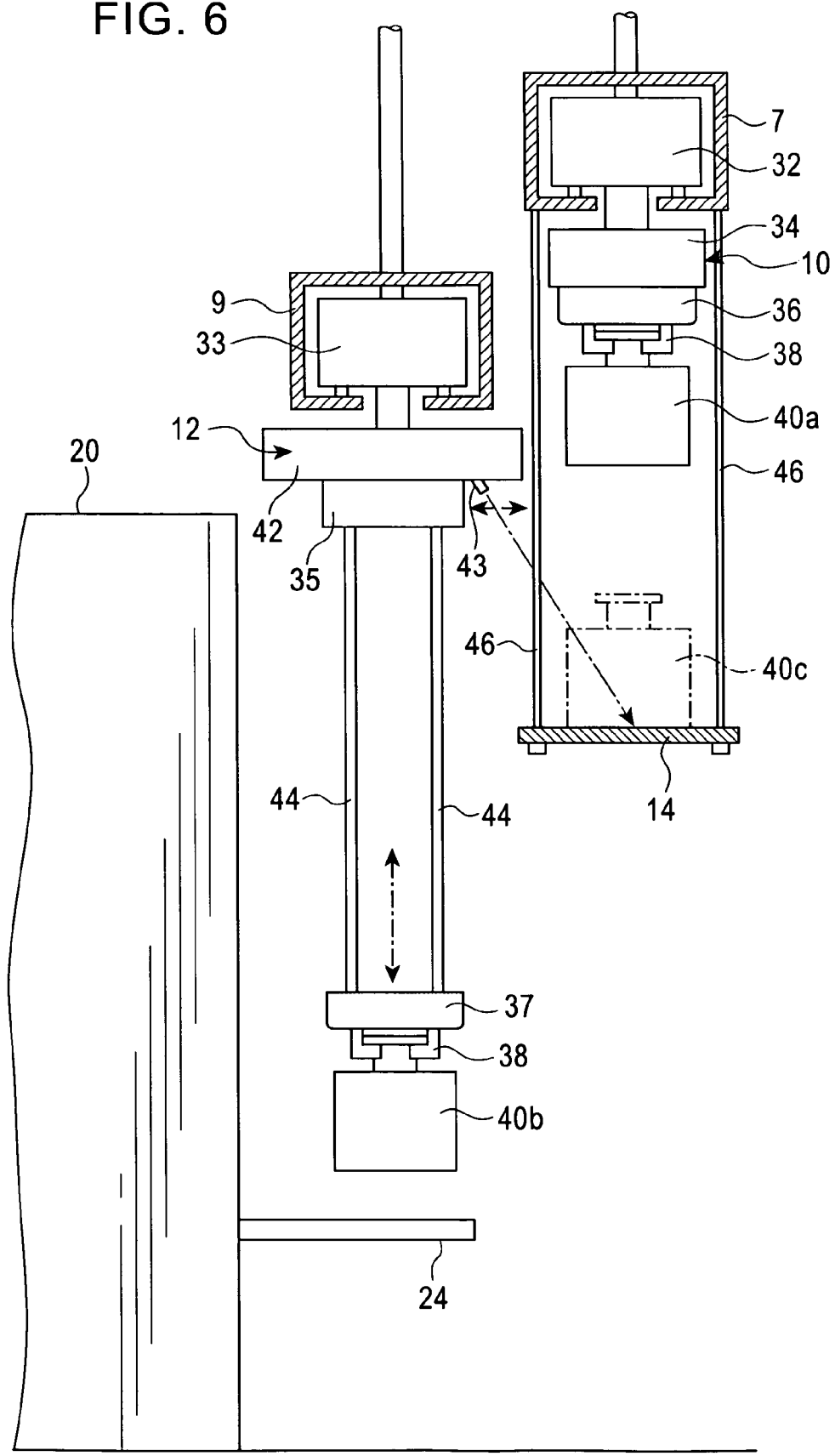
FIG. 6 is a front view of an essential part of an overhead vehicle system in accordance with a second embodiment.

FIG. 6 shows an embodiment in which the height level of the running rail corresponding to the intra-bay route 7 is different from that of the running rail 9 corresponding to the local route. The running rail 7 has a height level higher than that of the running rail 9 by at least a predetermined value so that even upon advancing from the overhead vehicle 12 running on the running rail 9, into the space above the buffer 14, the elevation and lowering driving section 35 does not interfere with the overhead vehicle 10 running on the running rail 7. To achieve this, it is only necessary that the bottom surface of an article 40a conveyed by the overhead vehicle 10 be located above the top surface of part of the overhead vehicle 12 advancing into the space above the buffer 14, in this case, the top surface of the elevation and lowering driving section 35. The embodiment in FIG. 6 is similar to the embodiment shown in FIGS. 1 to 4 or the variation in FIG. 5.

In the embodiment shown in FIG. 6, even when laterally moved from the overhead vehicle 12 to the space above the buffer 14, the elevation and lowering driving section 35 does not interfere with the article 40a being conveyed by the overhead vehicle 10. Thus, the overhead vehicle 10 can run on the running rail 7 even while the overhead vehicle 12 is delivering or receiving an article 40c shown by a chain line to or from the buffer 14. Both the overhead vehicles 10, 12 can deliver and receive articles to and from the buffer 14. The overhead vehicle 12 can transfer articles between the buffer 14 and the load port 24. 40b is an article being delivered to or received from the load port 24 by the overhead vehicle 12. 40c is an article on the buffer 14.

The invention claimed is:

1. A conveying vehicle system, comprising:
   a plurality of facilities, each of the facilities having at least one load port;
   a first traveling rail arranged along the plurality of facilities;
   a first overhead traveling vehicle that runs along the first traveling rail and conveys articles between the plurality of facilities, the first overhead traveling vehicle including an elevating and lowering driving section configured to elevate and lower a platform;

a second traveling rail locally provided near the plurality of facilities and closer to the plurality of facilities than the first traveling rail, the load ports of the plurality of facilities being located immediately below a portion of the second traveling rail;

a buffer locally provided near the plurality of facilities, the buffer being provided immediately below a portion of the first traveling rail and parallel to the second traveling rail, the buffer including a plurality of storage locations to store articles placed on the buffer by the first overhead traveling vehicle, wherein successive storage locations of the plurality of storage locations abut each other and extend in a horizontal direction along the first traveling rail, a second overhead traveling vehicle that runs in a horizontal direction along the second traveling rail, the second overhead traveling vehicle including a platform, an elevating and lowering driving section that elevates and lowers the platform, and a lateral feeding mechanism for feeding the elevating and lowering driving section and the platform in a direction that is at a right angle to the second traveling rail while the second overhead traveling vehicle is at a stopped position, wherein the first overhead traveling vehicle elevates and lowers the platform to transfer the article to and from the buffer, wherein the second overhead traveling vehicle moves to respective positions adjacent any of the successive storage locations of the buffer so that the second overhead traveling vehicle can transfer an article between any storage location of the buffer and the facilities, wherein the second overhead traveling vehicle transfers an article between the buffer and the facility by moving the lateral feeding mechanism to laterally feed the elevating and lowering driving section and the platform to above the buffer, the elevating and lowering driving section lowers the platform and grips an article on the buffer and elevates the platform, the lateral feeding mechanism laterally moves the elevating and lowering driving section to above a load port of a facility and the elevating and lowering driving section lowers the platform to deliver the article to the facility, wherein a running direction of the portion of the first traveling rail having the buffer immediately below and a running direction of the portion of the second traveling rail having the load ports immediately below are parallel to each other, and wherein a distance between the portion of the first traveling rail having the buffer immediately below and the portion of the second traveling rail having the load ports immediately below is such that the second overhead traveling vehicle is capable of transferring an article between a storage location of the buffer and a load port of a facility while at a stopped position.

2. A conveying vehicle system according to claim 1, wherein the buffer is provided below the first traveling rail and on a side of the second traveling rail.

3. A conveying vehicle system, comprising:

a plurality of facilities, each of the facilities having at least one load port;

a first traveling rail arranged along the plurality of facilities;

a first overhead traveling vehicle that runs along the first traveling rail and conveys articles between the plurality of facilities, the first overhead traveling vehicle including an elevating and lowering driving section configured to elevate and lower a platform;

a second traveling rail locally provided near the plurality of facilities and closer to the plurality of facilities than the first traveling rail, the load ports of the plurality of facilities being located immediately below the second traveling rail;

a buffer locally provided near the plurality of facilities, the buffer being provided immediately below the first traveling rail and parallel to the second traveling rail, the buffer including a plurality of storage locations to store articles placed on the buffer by the first overhead traveling vehicle, wherein successive storage locations of the plurality of storage locations abut each other and extend in a horizontal direction along the first traveling rail, a second overhead traveling vehicle that runs in a horizontal direction along the second traveling rail, the second overhead traveling vehicle including a platform, an elevating and lowering driving section that elevates and lowers the platform, and a lateral feeding mechanism for feeding the elevating and lowering driving section and the platform in a direction that is at a right angle to the second traveling rail while the second overhead traveling vehicle is at a stopped position, wherein the first overhead traveling vehicle elevates and lowers the platform to transfer the article to and from the buffer, wherein the second overhead traveling vehicle moves to respective positions adjacent any of the successive storage locations of the buffer so that the second overhead traveling vehicle can transfer an article between any storage location of the buffer and the facilities, and wherein the second overhead traveling vehicle transfers an article between the buffer and the facility by moving the lateral feeding mechanism to laterally feed the elevating and lowering driving section and the platform to above the buffer, the elevating and lowering driving section lowers the platform and grips an article on the buffer and elevates the platform, the lateral feeding mechanism laterally moves the elevating and lowering driving section to above a load port of a facility and the elevating an lowering driving section lowers the platform to deliver the article to the facility, wherein a running direction of the first traveling rail having the buffer immediately below and a running direction of the second traveling rail having the load ports immediately below are parallel to each other, and wherein a height level of the first traveling rail is higher than the height level of the second traveling rail by a distance such that when the second overhead traveling vehicle is in a stopped state and the lateral feeding mechanism feeds the elevating and lowering driving section and the platform to above a particular storage location of the buffer, the first overhead traveling vehicle can run on the first traveling rail directly above the particular storage location of the buffer.

* * * * *